United States Patent
Rust et al.

(10) Patent No.: US 7,480,815 B2
(45) Date of Patent: Jan. 20, 2009

(54) CONTROLLER COMMUNICATIONS OVER AN ALWAYS-ON CONTROLLER INTERCONNECT

(75) Inventors: Robert A. Rust, Boise, ID (US); Tammy T. Van De Graaff, Boise, ID (US); Barry J. Oldfield, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 11/150,796

(22) Filed: Jun. 10, 2005

(65) Prior Publication Data

US 2005/0246579 A1    Nov. 3, 2005

Related U.S. Application Data

(63) Continuation of application No. 10/146,546, filed on May 14, 2002, now abandoned.

(51) Int. Cl.
 *G06F 11/00* (2006.01)
(52) U.S. Cl. .................. 714/4; 714/9; 714/11
(58) Field of Classification Search ............ 714/4, 714/9, 11
 See application file for complete search history.

(56) References Cited

U.S. PATENT DOCUMENTS

| | | | | |
|---|---|---|---|---|
| 4,354,267 A | * | 10/1982 | Mori et al. ............ | 714/4 |
| 5,544,330 A | * | 8/1996 | Bither et al. ............ | 710/100 |
| 5,761,705 A | * | 6/1998 | DeKoning et al. ...... | 711/113 |
| 6,128,750 A | * | 10/2000 | Espy et al. ............. | 714/7 |
| 6,192,027 B1 | * | 2/2001 | El-Batal ................. | 370/222 |
| 6,230,240 B1 | | 5/2001 | Shrader et al. | |
| 6,330,687 B1 | | 12/2001 | Griffith | |
| 6,504,817 B2 | * | 1/2003 | Oldfield et al. ......... | 370/217 |
| 6,578,158 B1 | * | 6/2003 | Deitz et al. ............. | 714/11 |
| 6,643,795 B1 | * | 11/2003 | Sicola et al. ............ | 714/6 |
| 2003/0065841 A1 | * | 4/2003 | Pecone .................. | 710/105 |

FOREIGN PATENT DOCUMENTS

| | | |
|---|---|---|
| EP | 0845906 | 6/1998 |
| WO | WO9926150 | 5/1999 |
| WO | WO0039690 | 7/2000 |
| WO | WO0114991 | 3/2001 |

* cited by examiner

*Primary Examiner*—Michael C Maskulinski (57) ABSTRACT

A controller interconnect structure within a RAID disk array enables continuous low latency/high bandwidth communications between a plurality of controller pairs within the array. Mirror buses carry high speed mirror traffic between mirrored controllers performing mirrored memory operations. Loop buses carry inter-processor communications and other traffic between controller pairs coupled together in a controller loop. Benefits of the interconnect structure include an ability to support continued controller communications and online disk array operations under various failure and repair conditions that might otherwise render a disk array inoperable. In addition, the controller interconnect structure provides for easy expansion of the number of controllers within disk arrays as arrays continue to be scaled up in size to meet increasing storage demands from user host systems.

25 Claims, 8 Drawing Sheets

CONTROLLER COMMUNICATIONS OVER AN ALWAYS-ON CONTROLLER INTERCONNECT

RELATED APPLICATION(S)

This is a continuation of U.S. patent application Ser. No. 10/146,546, entitled "Controller Communications Over an Always-On Controller Interconnect" which was filed May 14, 2002 now abandoned, and is assigned to the Hewlett-Packard Company.

TECHNICAL FIELD

The present disclosure relates to disk arrays, and more particularly, to a controller interconnect structure within multi-controller disk arrays that permits continued communication between controllers under various failure scenarios.

BACKGROUND

Modern mass storage systems continue to provide increasing storage capacities to meet user demands from host computer system applications. A growing reliance on large capacity mass storage has fueled a corresponding demand for enhanced reliability of such storage systems. One popular solution to the demands for increased storage capacity and reliability is the use of multiple smaller storage modules configured in geometries that permit redundancy of stored data to assure data integrity in case of various failures.

RAID (redundant array of independent disks) disk arrays are an example of a fault tolerant, mass storage technology that has developed in response to the ever-increasing demands for greater storage capacity and reliability. RAID disk arrays supply host computer systems with large amounts of storage capacity in addition to providing redundancy of stored data to assure data integrity in case of various failures. Such disk arrays therefore typically include redundant components such as controllers and power supplies, as well as hot-swap capabilities for various subsystem modules (i.e., an ability to change-out modules without powering down the system).

Conventional RAID arrays commonly have two controllers that manage the array and perform mirrored memory operations for data redundancy. The controllers make the array appear to the host computer as a single, highly reliable, high capacity disk drive. Both controllers have independent access to all data cache information, all input/output (I/O) state information, and all system state information so that a failure of one of the controllers does not prevent the remaining working controller from accessing all the necessary information to take over sole operation of the array. Significant bandwidth is required on controller interconnect buses to allow the controllers to transfer the necessary information for processing host I/O requests and performing mirrored memory operations.

As disk arrays become larger, controller pairs can be added to the arrays to increase their computing resources and maintain or improve system performance. However, as the number of controller pairs increases, the amount of data flowing between controllers over the controller interconnect buses increases dramatically. As an example, when a controller pair "A" receives a host computer write command that is destined for the cache memory on controller pair "B", the controller interconnect not only carries mirrored data traffic and interprocessor communications between controllers in pair "B", but it also carries pair-to-pair traffic between the two controller pairs "A" and "B". First, the interconnect must carry the traffic from the controller board in pair "A" that received the host data to the controller board in pair "B" that is the destination of the host data. Second, the interconnect must carry the mirror traffic between the two controller boards that form controller pair "B". Therefore, an increase in the number of controller pairs within a disk array can contribute to performance bottlenecks due to bandwidth limitations of the controller interconnect buses.

Another consideration regarding controller interconnects is emerging technologies that allow for wider interfaces between disk arrays and host systems. As higher performance host computer connections are developed for connecting RAID storage arrays to host computer systems, controller interconnect buses experience a corresponding increase in the amount of data flowing between controllers within an array. Again, bandwidth limitations on controller interconnect buses within the array can result in performance bottlenecks.

Another problem that results from adding more controllers to a disk array (i.e. clustering the controllers) is that more and more data travels to remote controllers rather than a local controller in the mirrored controller pair where the data is received. Where there are only 2 controller boards in a disk array, all the host computer disk traffic is destined for the local mirrored cache because there is only one mirrored cache. However, when there are 4 controller boards in an array, the percentage of data flowing to the local mirrored cache drops to 50%. Half the traffic stays with the local cache memory while the other half is destined for the remote pair's cache memory. With 16 pairs of controllers, only about 7% of the traffic is local. Thus, the characteristics of the controller interconnect changes dramatically with the clustering of controllers in the disk array.

Another important consideration regarding communications between controllers in a clustered disk array is the effect that failures in the controller interconnect have on the operability of the array. Currently, a failure in a controller interconnect can result in a failure in the operation of related array elements. In order to avoid a permanent lock-up of the disk array under such circumstances, various timeout functions must be designed and built into the array hardware. This causes difficulties in hardware design and also increases the complexity of firmware that must be able to tolerate the loss of controller communications without notice.

Accordingly, the need exists for a controller interconnect structure in disk arrays having clustered controllers that provides for the efficient use of current and future interconnect bandwidth capabilities and that enables continued controller-to-controller communications and disk array operability under various interconnect failure scenarios.

SUMMARY

A controller interconnect structure permits low latency/high bandwidth communications through mirror buses that couple controllers together as mirrored controller pairs within a RAID disk array having a plurality of mirrored (i.e. clustered) controller pairs. The interconnect structure also forms a controller loop that couples controllers together through loop buses. The controller loop provides an automatic failover function that enables continued communications between controller pairs in the event that a failure occurs within the controller loop.

In a first embodiment, a disk array includes at least two pairs of controllers. Each controller pair has a first and second controller that perform mirrored memory operations through a mirror bus that carries mirror data traffic between the two mirrored controllers in the controller pair. In addition, a controller loop is formed by the interconnection of all the controllers through a plurality of loop buses. Each controller is coupled to two logically adjacent controllers through a loop bus such that a continuous loop of controllers is formed. The controller loop permits data and control information to travel in both directions along the loop between the two or more controller pairs. Routing logic in each controller controls the flow of data in the loop such that data packets are normally routed to the nearest mirrored controller associated with array addresses in the data packet headings.

A failure in the controller loop causes the loop to fail into a single string of controllers. Although the controller loop has failed, the controller string is capable of providing continued communication between all controller pairs. Hardware circuitry on each controller provides an automatic fail-over function that tolerates failures in the controller loop by detecting a failure and rerouting data in a different direction to avoid the failure. Therefore, data initially traveling in one direction through the loop will be rerouted or "bounced" in the opposite direction when a loop failure is encountered. The controller string then carries the data to its destination controller pair.

Another embodiment includes the controllers configured as in the prior embodiment, coupled together through two back plane interconnect boards. One half of each mirror bus and one half of each loop bus runs through each of the two back planes. Both halves of each bus can work in unison under normal operation or one half of each bus is able to take over all the data traffic of both halves in the event of a failure condition. Thus, the dual back plane configuration permits on-line repair of either back plane. Hardware circuitry on controller boards automatically detects failed links between boards. A detected failure on any bus automatically fails the bus over to using the operational half of the bus. Thus, either one of the two back planes can be removed and repaired while data continues flowing between controllers over the operational half of each bus that runs through the remaining back plane.

A third embodiment includes two or more sets of controllers generally configured as in the prior embodiments and logically coupled into levels. The embodiment allows the size of a disk array system to be scaled up significantly by expanding the number of controllers through additional controller loops. Each loop of controllers is configured as a level of controllers stacked upon another level of controllers. Each additional controller loop has the same properties as in the previously described embodiments where broken or failed links do not disable the transfer of data through the system.

In another embodiment, controllers include programmable routing registers that contain routing information to control the direction of data flow along a controller loop. The routing registers permit a matched data flow along loop bus segments so that no single loop bus segment is over burdened. When a controller receives a host computer I/O command, the controller's routing logic is configured to access the routing information from the programmable routing register to determine the direction in which to send the I/O command data.

In yet another embodiment, routing logic is configured to reprogram routing registers when a failure occurs in a controller loop so that data flow between controllers is more efficient. Hardware circuitry automatically detects a failure and reroutes data to avoid the failure. However, continually sending data in one direction and then rerouting it by a "hardware" reroute is not the most efficient use of the interconnect structure's capacity. Therefore, when hardware detects a failure and reroutes data, it also notifies the routing logic of the failure so routing registers will be reprogrammed to provide modified data routes that avoid the failure without traversing the less efficient hardware reroute. Data is thus initially routed in a direction that avoids the failure. The hardware detection circuitry can also be configured to reprogram routing registers.

BRIEF DESCRIPTION OF THE DRAWINGS

The same reference numbers are used throughout the drawings to reference like components and features.

DETAILED DESCRIPTION

A controller interconnect structure within a RAID disk array enables continuous low latency/high bandwidth communications between a plurality of controller pairs within the array. Mirror buses carry high speed mirror traffic between mirrored controllers performing mirrored memory operations. Loop buses carry inter-processor communications and other traffic between controller pairs coupled together in a controller loop. Benefits of the interconnect structure include an ability to support continued controller communications and online disk array operations under various failure and repair conditions that might otherwise render a disk array inoperable. In addition, the controller interconnect structure provides for easy expansion of the number of controllers within disk arrays as arrays continue to be scaled up in size to meet increasing storage demands from user host systems.

Figure 1:
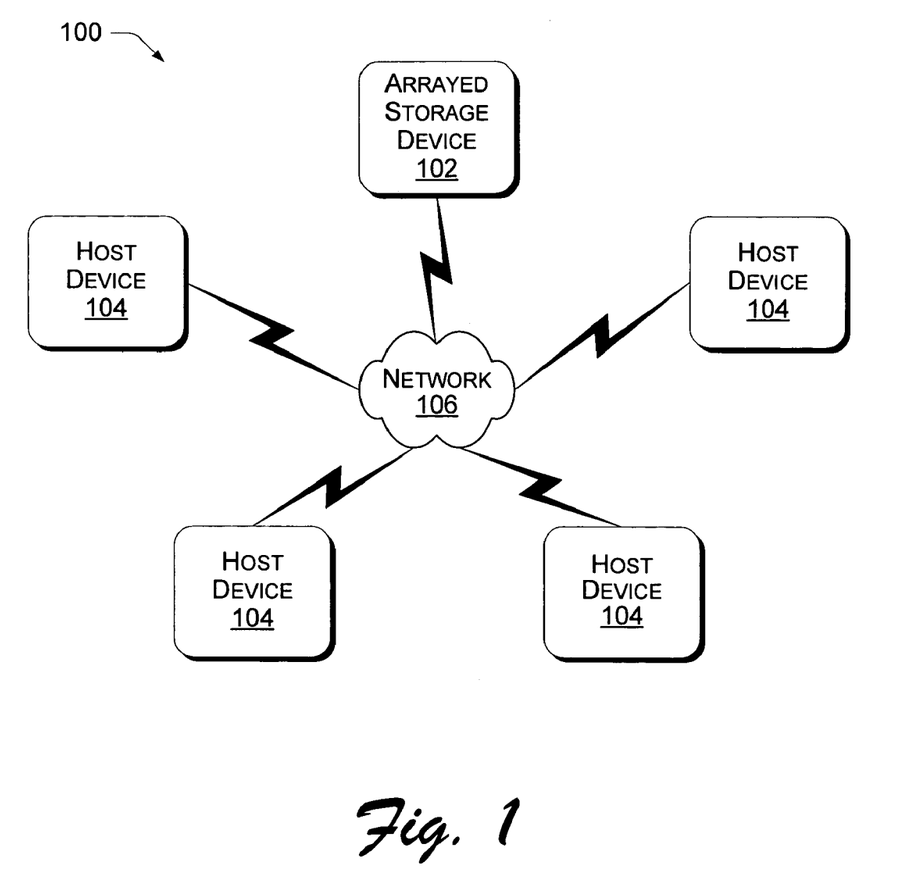
FIG. 1 illustrates a system environment that is suitable for implementing an arrayed storage device having an always-on controller interconnect structure.

Exemplary System Environment for Implementing an Always-On Controller Interconnect Structure FIG. 1 illustrates a system environment 100 suitable for implementing an always-on controller interconnect structure. The system 100 includes arrayed storage device (e.g. a RAID storage array) 102 operatively coupled to host device(s) 104 through network 106. Storage device 102 typically provides for multiple redundant network connections 106. Network connection 106 can include, for example, a LAN (local area network), a WAN (wide area network), an intranet, the Internet, a fiber optic cable link, a wireless link, a direct connection, or any other suitable communication link. Host device(s) 104 can be implemented as a variety of general purpose computing devices including, for example, a personal computer (PC), a laptop computer, a server, a Web server, and other devices configured to communicate with arrayed storage device 102.

Although embodiments of arrayed storage device 102 are disclosed herein as RAID storage arrays, the arrayed storage device 102 is not limited in this regard. Accordingly, this disclosure is applicable to other configurations of arrayed storage components as currently exist or as might exist in the future that include different array architectures intended to offer high-performance, fault-tolerant mass storage similar to that provided by currently available RAID systems. Therefore, arrayed storage device 102 more generally refers to a plurality of storage components/devices operatively coupled in an array for the general purpose of increasing storage performance. Storage performance goals typically include storage capacity, low cost per stored megabyte, high input/output performance, and high data availability through redundancy and fault tolerance. Storage components/devices operatively coupled within arrayed storage devices 102 may include devices such as magnetic disk drives, tape drives, optical read/write disk drives, solid state disks and the like. Such storage components are generally well known in the art of data storage technology.

Figure 2:
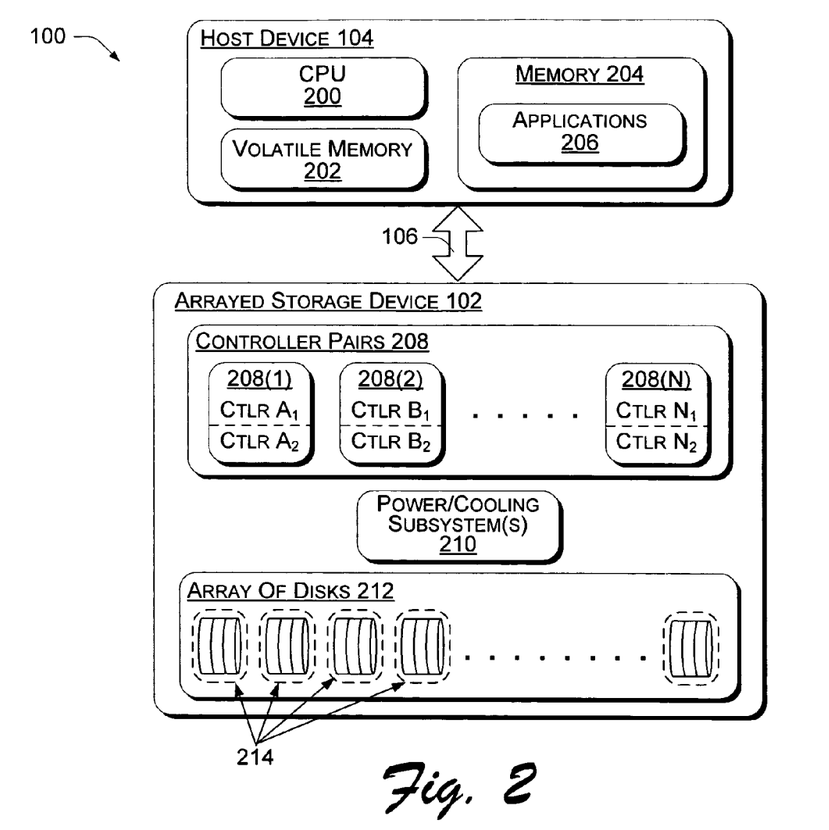
FIG. 2 is a block diagram illustrating in greater detail, a particular embodiment of the system environment of FIG. 1 including a host computer device and an arrayed storage device implemented as a RAID disk array having an always-on controller interconnect structure.
Figure 3:
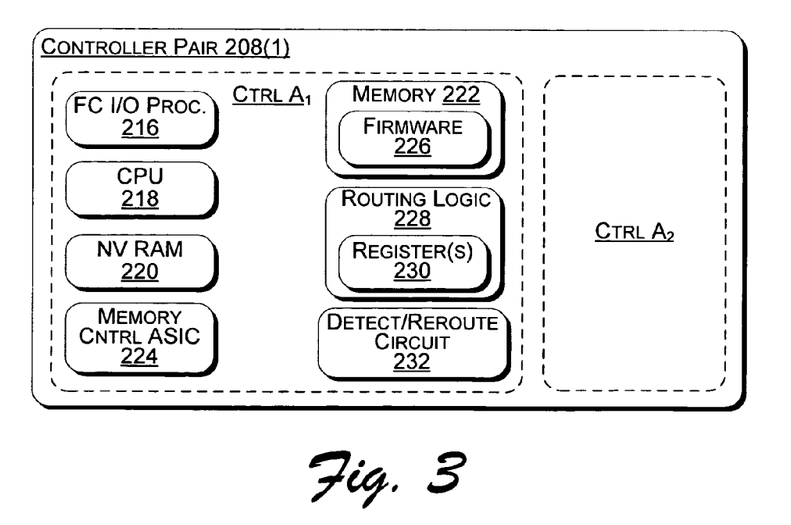
FIG. 3 is a block diagram illustrating in greater detail, a controller pair such as the controller pair illustrated in the block diagram of FIG. 2.

Exemplary Embodiment of a System for Implementing an Always-On Controller Interconnect Structure FIGS. 2 and 3 are block diagrams illustrating a particular embodiment of a host computer device 104 and an arrayed storage device 102 as might be implemented in the system environment 100 of FIG. 1. The arrayed storage device 102 of FIG. 1 is embodied in FIG. 2 as a RAID storage array 102 having a plurality of clustered controller pairs 208. Host device 104 is embodied generally as a computer such as a personal computer (PC), a laptop computer, a server, a Web server, or other computer device configured to communicate with RAID storage array 102.

Host device 104 typically includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer readable instructions, data structures, program modules and other data for host device 104. Host device 104 may implement various application programs 206 stored in memory 204 and executed on processor 200 that create or otherwise access data to be transferred via network connection 106 to RAID storage array 102 for storage and subsequent retrieval. Such applications 206 might include software programs implementing, for example, word processors, databases, spread sheets, browsers, multimedia players, illustrators, computer-aided design tools and the like. Thus, host device 104 provides a regular flow of data I/O requests to be serviced by RAID storage array 102.

RAID storage array 102 is generally designed to provide continuous data storage and data retrieval for computer devices such as host device(s) 104, and to do so under various fault conditions that may occur. Thus, RAID array 102 typically includes redundant subsystems such as controller pairs 208 and power and cooling subsystems 210 that permit continued access to the RAID array 102 even during a failure of one of the subsystems. In addition, RAID array 102 typically provides hot-swapping capabilities for array components (i.e. the ability to remove and replace components while the array 102 remains online) such as the controllers in controller pairs 208, the power/cooling subsystems 210, and the disk drives 214 in the array of disks 212.

Each controller pair on RAID array 102 includes a first controller (e.g., CTLR $A_1$) and a second controller (e.g., CTLR $A_2$). The two controllers in each controller pair 208 mirror each other and are generally configured to redundantly store and access data on disk drives 214. Thus, controllers $A_1$ and $A_2$ perform tasks such as mapping host data to disk drives, performing RAID calculations, mirroring data between redundant controller boards, attaching validation tags to data before saving the data to disk drives 214 and checking the tags to ensure data from a disk drive 214 is correct before sending the data back to a host device 104. Controllers in each controller pair 208 also tolerate faults such as disk drive 214 failures by recreating data that may be lost during such failures.

FIG. 3 is a block diagram illustrating an example of a controller $A_1$ from a controller pair 208(1) in more detail. Controller $A_2$ from controller pair 208(1) is represented in FIG. 3 but is not specifically detailed because it is configured the same as controller $A_1$. Referring to controller $A_1$ as a representative controller example, each controller in a controller pair 208 on RAID array 102 typically includes I/O processor(s) such as FC (fiber channel) I/O processor(s) 216, main processor(s) 218, nonvolatile (NV) RAM 220, memory 222 (e.g., ROM, RAM), and one or more ASICs (application specific integrated circuits) such as memory control ASIC 224. NV RAM 220 is typically supported by a battery backup (not shown) that preserves data in NV RAM 220 in the event power is lost to controller(s) 208. Memory 222 generally provides storage of computer readable instructions, data structures, program modules and other data for RAID storage array 102. Accordingly, nonvolatile memory 222 includes firmware 226 which is generally configured to execute on processor(s) 218 and support normal disk array 102 operations. Firmware 226 is also typically configured to handle various fault scenarios that may arise in RAID array 102.

As is more fully discussed herein below, routing logic 228 and routing register(s) 230 are configured to route data between various controller pairs 208 via a controller interconnect structure. Also discussed more fully below is a hardware detection and rerouting circuit 232 that is generally configured to detect controller interconnect failures and reroute data in order to circumvent such failures.

FC I/O processor(s) 216 on controllers (e.g., controller $A_1$ of FIG. 3) receives data and commands from host device 104 via network connection 106. FC I/O processor(s) 216 communicates with main processor(s) 218 through standard protocols and interrupt procedures to transfer data and commands to redundant controllers (e.g., controller $A_2$ of FIG. 3) and generally move data between NV RAM 220 and various disk drives 214 to ensure that data is stored redundantly.

Memory control ASIC 224 generally controls data storage and retrieval, data manipulation, redundancy management, and the like through communications between mirrored controllers such as controllers $A_1$ and $A_2$ of FIG. 3, for example. Memory controller ASIC 224 handles mirroring of data between controllers, tagging of data sectors being striped to disks 214 in the array of disks 212 and RAID calculations to write parity information across the disk drives 214, as well as data reconstruction in the event of a disk drive failure. Data striping and parity checking are well-known to those skilled in the art. Memory control ASIC 224 also typically includes internal buffers (not shown) that facilitate testing of memory 222 to ensure that all regions of mirrored memory (e.g., between mirrored controllers $A_1$ and $A_2$) are compared to be identical and checked for ECC (error checking and correction) errors on a regular basis. Memory control ASIC 224 notifies processor 218 of these and other errors it detects. Firmware 226 is configured to manage errors detected by memory control ASIC 224 in a tolerant manner which may include, for example, preventing the corruption of array 102 data or working around a detected error/fault through a redundant subsystem to prevent the RAID array 102 from crashing.

Exemplary Embodiments of an Always-On Controller Interconnect Structure

Figure 4:
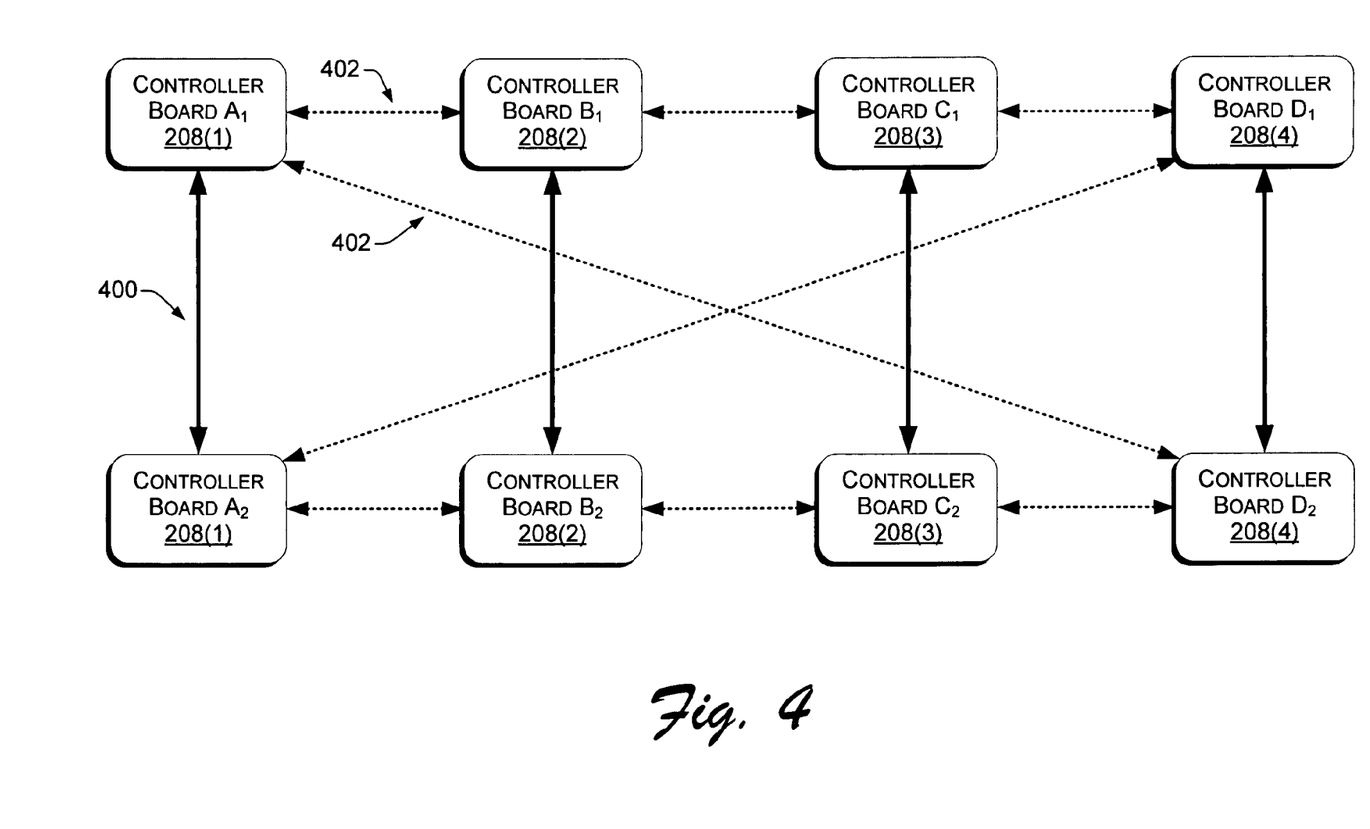
FIG. 4 shows a logical representation of a controller interconnect structure such as might be implemented in the RAID disk array of FIG. 2.

FIG. 4 illustrates an example of an always-on controller interconnect structure that is suitable for implementation in the RAID storage array 102 of FIGS. 1 and 2. FIG. 4 includes a plurality of controller pairs 208 interconnected through a network of mirror buses 400 (represented by solid-lined arrows) and loop buses 402 (represented by dashed-lined arrows). Each controller pair 208(1), 208(2), 208(3), and 208(4) includes a first and second controller operatively coupled through a first interconnect, or mirror bus 400. For example, controller $A_1$ is coupled to controller $A_2$ through a mirror bus 400, controller $B_1$ is coupled to controller $B_2$ through another mirror bus 400, and so on. The mirror buses 400 carry mirror traffic between the two controllers in each of the mirrored controller pairs 208(1), 208(2), 208(3), and 208(4). The mirror buses 400 between each controller pair 208 are therefore capable of providing low latency/high bandwidth transfers as host data and RAID maps are stored and accessed in mirrored memory (i.e. NV RAM 220).

Each controller in the controller interconnect structure of FIG. 4 is additionally coupled to two other logically adjacent controllers through a second interconnect, called loop buses 402. The two logically adjacent controllers coupled to a particular controller through loop buses 402 do not include that particular controller's mirrored controller, which is already coupled through a mirror bus 400. Thus, controller $B_1$, for example, is coupled to logically adjacent controllers $A_1$ and $C_1$ through loop buses 402.

The controller interconnect structure includes two points where loop buses 402 cross over between first controllers from the controller pairs 208 to second controllers from the controller pairs 208. The cross over forms a connection between a row of first controllers (i.e., $A_1, B_1, C_1$ and $D_1$) and a row of second controllers (i.e., $A_2, B_2, C_2$ and $D_2$), which in turn forms a continuous loop of controllers. Referring to the controller interconnect structure of FIG. 4, a loop bus 402 crosses over to couple first controller $A_1$ to logically adjacent second controller $D_2$. Similarly, a loop bus 402 crosses over to couple first controller $D_1$ to logically adjacent second controller $A_2$. Thus, each controller forms part of a continuous controller loop by virtue of being coupled to two logically adjacent, but non-mirrored, controllers.

Whereas mirror buses 400 typically carry mirror traffic between two controllers within a mirrored controller pair (e.g., 208(1)), the loop buses 402 carry traffic between the various controller pairs. Pair-to-pair traffic, or "loop traffic", includes data received at one controller (e.g., controller $A_1$ of controller pair 208(1)) that is destined for another pair of mirrored controllers (e.g., controller pair 208(3)) in addition to all IPC (inter-processor communication) traffic. Pair-to-pair traffic flows in both directions around the controller loop.

As mentioned briefly above, routing logic 228 and routing register(s) 230 (see FIG. 3) are configured to route data between various controller pairs 208 via the controller interconnect structure. In general, the routing logic 228 routes data along the continuous controller loop (see FIG. 4) so that data arrives at its destination via the quickest route and, so that each segment of the controller loop is used efficiently. The routing logic 228 determines the best direction to send data along the controller loop based on information/instructions from routing register(s) 230 and on the array's mapping of host addresses to array addresses. A controller that receives the data assigns a header or data packet heading that identifies which controller pair 208 is the proper destination for the data. The routing logic 228 uses routing register 230 instructions associated with the data header to send the data in a direction along the controller loop which typically, but not necessarily, takes the data to the nearest mirrored controller of the destination controller pair. For example, data received from a host 104 by controller $A_1$ 208(1) that is destined for controller pair B 208(2) will be routed to the right, over the single loop bus 402 segment between controllers $A_1$ and $B_1$. Thus, the data is routed to the nearest mirrored controller $B_1$ of the destination controller pair B 208(2).

Routing register(s) 230 are programmable registers located in the routing logic 228 that provide the routing logic 228 with information on which direction to send data destined for a controller pair 208. Routing register(s) 230 are initially programmed, for example, by processor 218 to contain information that the routing logic 228 uses to determine which direction to route data over the controller loop (see FIG. 4).

Under certain circumstances, the nearest mirrored controller of a destination controller pair 208 may be equidistant from the controller sending the data. For example, referring to FIG. 4, data received from a host device 104 by controller $A_1$ 208(1) that is destined for controller pair C 208(3), is an equal distance away from the nearest mirrored controller of destination controller pair C 208(3). That is, it is no closer for the routing logic 228 on controller $A_1$ to send the data to controller $C_1$ 208(3) by way of controller $B_1$ 208(2) than it is to send the data to controller $C_2$ 208(3) by way of controller $D_2$ 208(4). Assuming workloads from host device(s) 104 are spread evenly among the various controllers of FIG. 4, the programmable routing registers 230 permit an evenly matched flow of data over all loop bus 402 segments of the controller loop. Thus, in the case where the nearest mirrored controller of a destination controller pair 208 is equidistant from the controller sending the data, routing registers 230 may tell routing logic 228 on each controller to send such equidistant data in the same direction around the controller loop, such as to the right, or clockwise. Thus, when data at controller $A_1$ 208(1) is destined for controller pair C 208(3), it is sent to controller $C_1$ 208(3) by way of controller $B_1$ 208(2). Likewise, when data at controller $B_1$ 208(2) is destined for controller pair D 208(4), it is sent to controller $D_1$ 208(4) by way of controller $C_1$ 208(3), instead of being sent to controller $D_2$ 208(4) by way of controller $A_1$ 208(1). The result is that the loop bus 402 segment between controller $A_1$ 208(1) and controller $B_1$ 208(2) does not get overburdened by excess traffic. In addition, in the aggregate, when workloads from host device(s) 104 are spread evenly among the various controllers, the flow of data over each segment of the controller loop is evenly matched.

Figure 5:
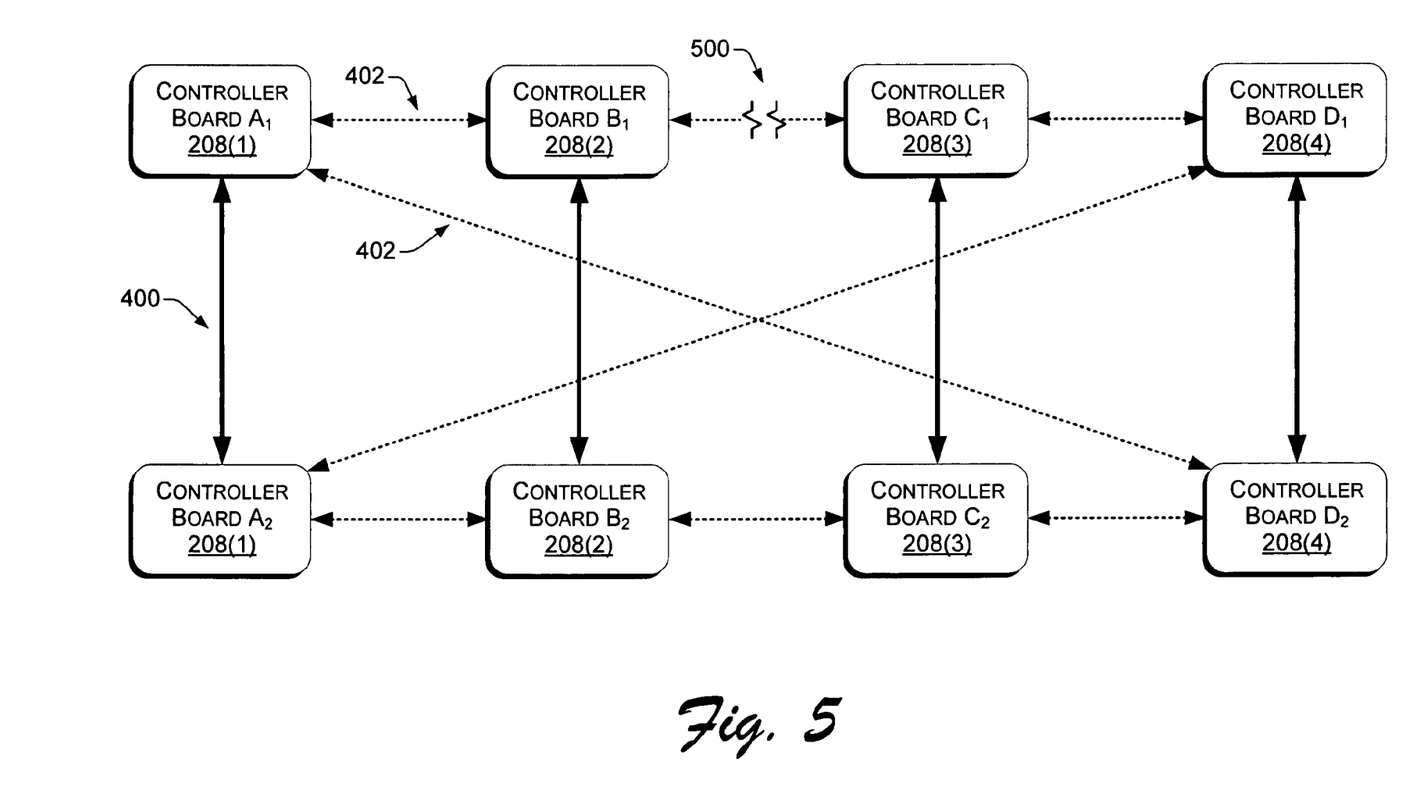
FIG. 5 illustrates the controller interconnect structure of FIG. 4 under a particular failure scenario.

As mentioned briefly above with reference to FIGS. 2 and 3, a failure detection and rerouting circuit 232 is configured to detect failures in the controller interconnect structure and to reroute data in order to circumvent the failures. FIG. 5 illustrates the controller interconnect structure of FIG. 4 discussed above and includes an example of a failure 500 in the controller loop at a particular point in the loop bus 402. It is apparent from FIG. 5 that a break in the controller loop interconnect structure causes the continuous controller loop to fail into a controller string. Thus, any failure 500 in the controller loop will mark the end points of the controller string. The endpoints of the controller string of FIG. 5 are at controller C₁ 208(3) and controller B₁ 208(2). The detection/rerouting hardware circuits 232 on controllers C₁ 208(3) and B₁ 208(2) automatically detect the loop failure 500 and "bounce" data that encounters the failure 500 back in the opposite direction. For example, if data is traveling from controller A₁ 208(1) through controller B₁ 208(2) to controller C₁ 208(3), the detection/rerouting hardware circuit 232 on controller B₁ 208(2) will "bounce" the data back over the controller string so it arrives at controller C₁ 208(3) by way of controller D₁ 208(4).

In addition to detecting and rerouting or "bouncing" data around a failure 500, the hardware circuits 232 can provide notification to processor(s) 218 of the failure so that the processor(s) 218 can reprogram the routing registers 230 on the controllers. This enables the routing logic 228 to avoid the failure 500 when it initially routes data over the controller interconnect structure. Reprogramming the routing registers 230 in this manner makes more efficient use of the controller interconnect under a failure condition. Alternatively, the hardware circuits 232 may themselves modify the routing information in the routing registers 230 under such failure conditions.

Under certain circumstances, mirror buses 400, which typically carry mirror traffic between two controllers within a mirrored controller pair (e.g., 208(1)), can also be used to carry "loop traffic". For example, in a "partially populated" back-plane configuration where a controller pair is not present, "loop traffic" data may be routed over a mirror bus 400 between a mirrored controller pair in order to avoid the non-present controllers while still maintaining a full controller loop interconnection. Therefore, the controller loop may be formed using both loop buses 402 and mirror buses 400. Under these circumstances, hardware circuits 232 would provide some low-level physical presence information to the routing logic 228 that will change the way traffic is routed through the controller loop.

Figure 6:
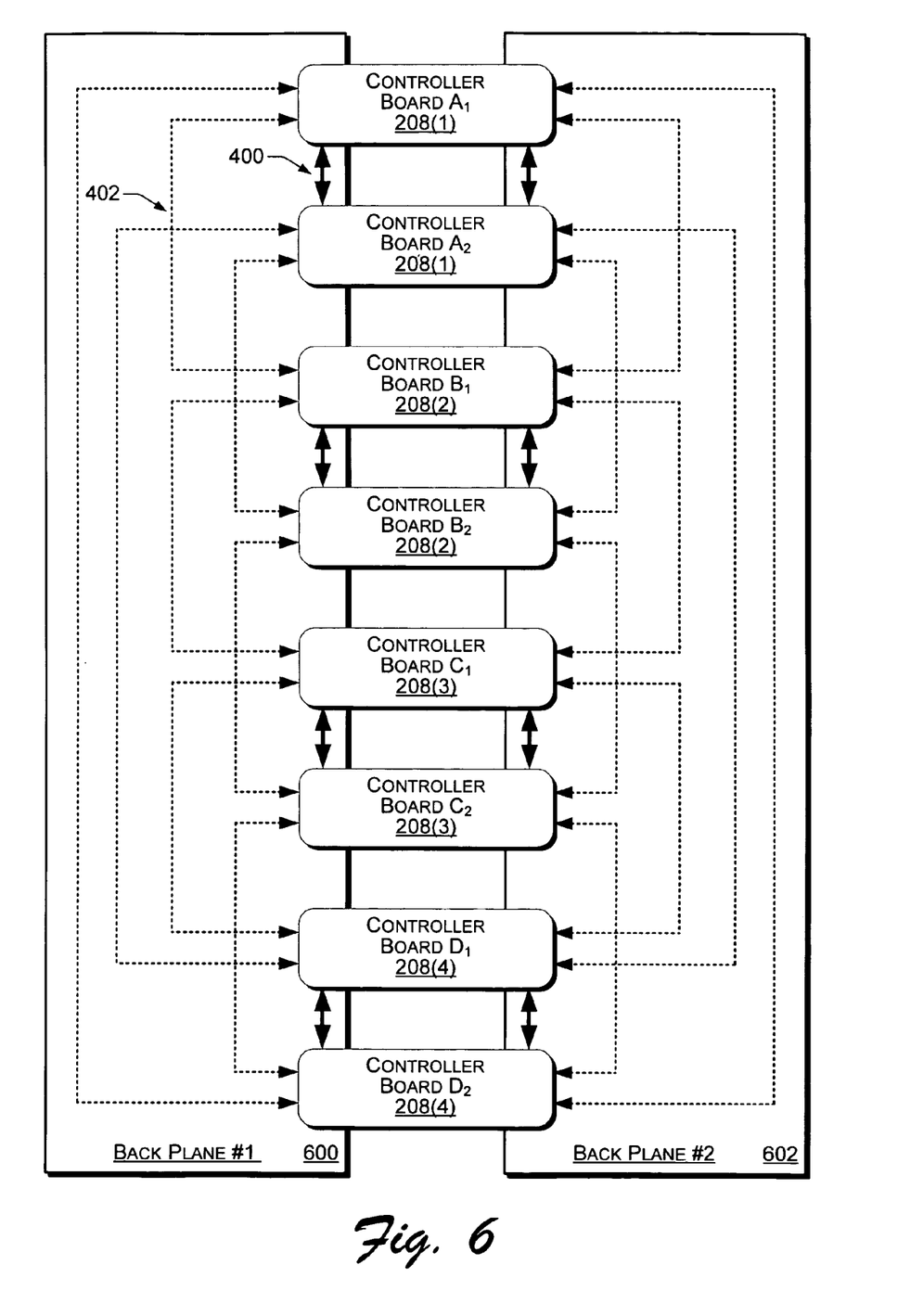
FIG. 6 illustrates a controller interconnect structure such as that of FIG. 4 in a redundant back plane configuration.

FIG. 6 illustrates another embodiment of the always-on controller interconnect structure suitable for implementation in the RAID storage array 102 of FIGS. 1 and 2. The interconnect structure of FIG. 6 is configured like the FIG. 4 interconnect structure described above. Thus, mirror buses 400 carry mirror traffic between the two controllers in each of the mirrored controller pairs 208(1), 208(2), 208(3), and 208(4), and each controller forms part of a continuous controller loop by virtue of being coupled, by interconnect 402, to two logically adjacent, but non-mirrored controllers. In addition, however, the FIG. 6 embodiment includes a dual back plane configuration that allows for the on-line repair of a failed back plane while the remaining back plane continues to provide a fully functioning interconnect structure between all controllers in the RAID storage array 102.

In the FIG. 6 embodiment, each controller from controller pairs 208(1), 208(2), 208(3), and 208(4) is coupled to or plugged into two separate interconnects. The interconnects are embodied as back planes 600 and 602. Back plane #1 600 and back plane #2 602 both carry one half of each bus that is shown in the controller interconnect structure of FIG. 4. In addition, each half of each bus (i.e., mirror buses 400 and loop buses 402) is bi-directional. Therefore, the loop bus 402 that carries pair-to-pair traffic from controller A₁ 208(1) to controller D₁ 208(4) is divided such that half of the traffic travels over back plane #1 600 and half the traffic travels over back plane #2 602. Furthermore, all loop buses 402 that make up the controller loop described in FIG. 4 are similarly divided between back plane #1 600 and back plane #2 602. Moreover, each mirror bus 400 carrying mirror traffic between two mirrored controllers in each of the controller pairs 208(1), 208(2), 208(3), and 208(4) is likewise divided such that half of the traffic travels over back plane #1 600 and half the traffic travels over back plane #2 602.

It will be apparent to those skilled in the art that the back planes described in the embodiment of FIG. 6 are not the only physical interconnect medium over which buses can be divided. Thus, the embodiment of FIG. 6 is illustrated by way of example rather than by way of limitation. For example, cables might be used as the physical interconnect medium over which the buses are divided in halves. Thus, the removal or failure of one cable carrying half of a bus would not prevent data from flowing over a cable carrying the other operational half of the bus.

Figure 7:
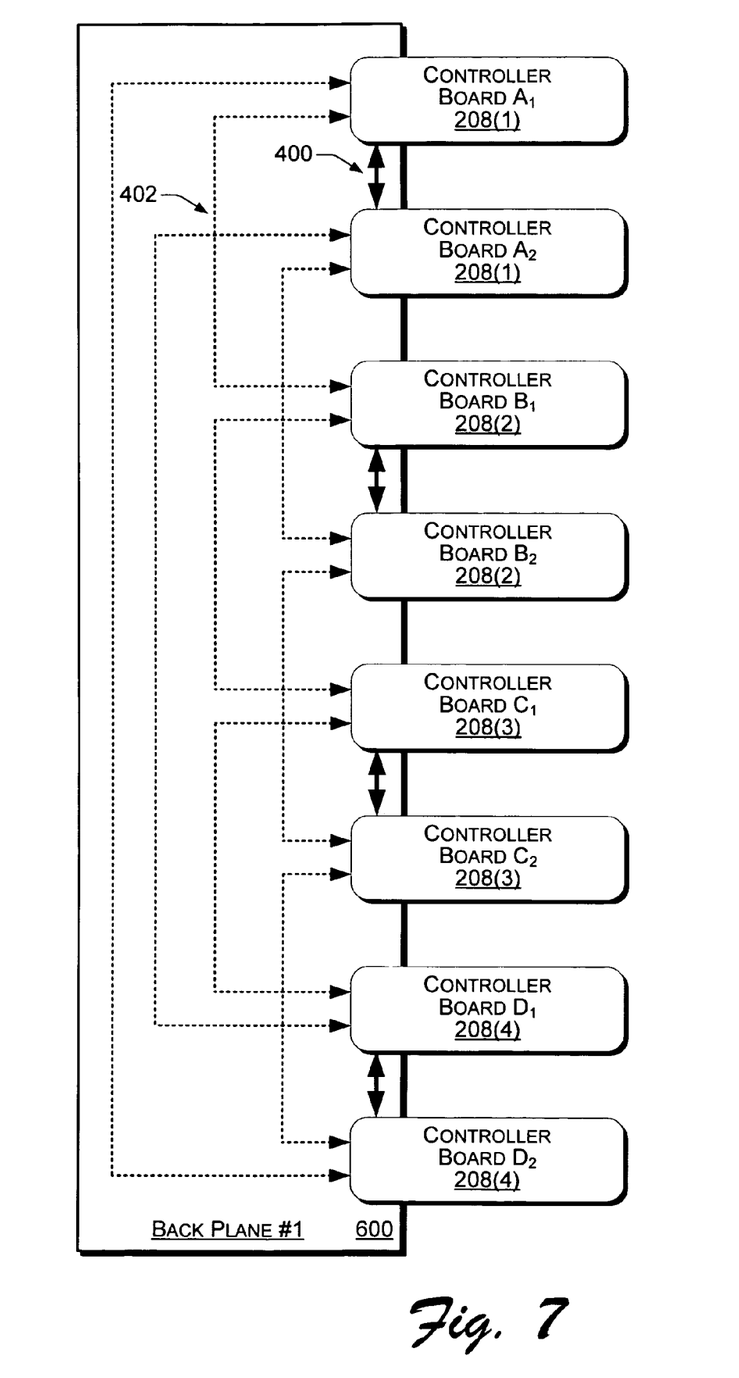
FIG. 7 illustrates the controller interconnect structure of FIG. 6 under a particular repair scenario.

FIG. 7 illustrates the always-on controller interconnect structure of FIG. 6 during operation while one of the two back planes 600, 602 has been removed. The dual back plane configuration interconnect structure of FIG. 6 permits the RAID storage array 102 to remain on-line and operational while either one of the two back planes is faulted or removed for repair. As discussed above with respect to FIG. 5, failure detection and rerouting circuitry 232 on each controller automatically detects failed links in the controller interconnect structure. Once the hardware circuit 232 detects that a portion of a link or bus (400, 402) is no longer operational, it will fail-over to the working portion. As illustrated in FIG. 7, removal of back plane #2 602 causes the failure detection and routing circuitry 232 on each controller board 208 to fail over to using the operational half of each bus that is still being carried over back plane #1 600. The remaining back plane (i.e., back plane #1 600) continues to provide all of the controller-to-controller communications and data flow that takes place under normal operating conditions. Therefore, the disk array 102 can remain on-line and operational.

Although the always-on controller interconnect structures described above with reference to FIGS. 4, 5, 6 and 7 include 4 controller pairs, the interconnect structures are not limited in this regard. Specifically, each controller interconnect structure is flexible to accommodate additional or fewer controller pairs 208. For example, the controller interconnect structure can have as few as 2 controller pairs, or as many as 16, 32, or more controller pairs 208 operatively coupled in the same general interconnect configuration as shown in FIGS. 4, 5, 6 and 7. Increasing the number controller pairs 208 beyond those shown in FIGS. 4, 5, 6 and 7 would involve extending the controller loops in these configurations.

Figure 8:
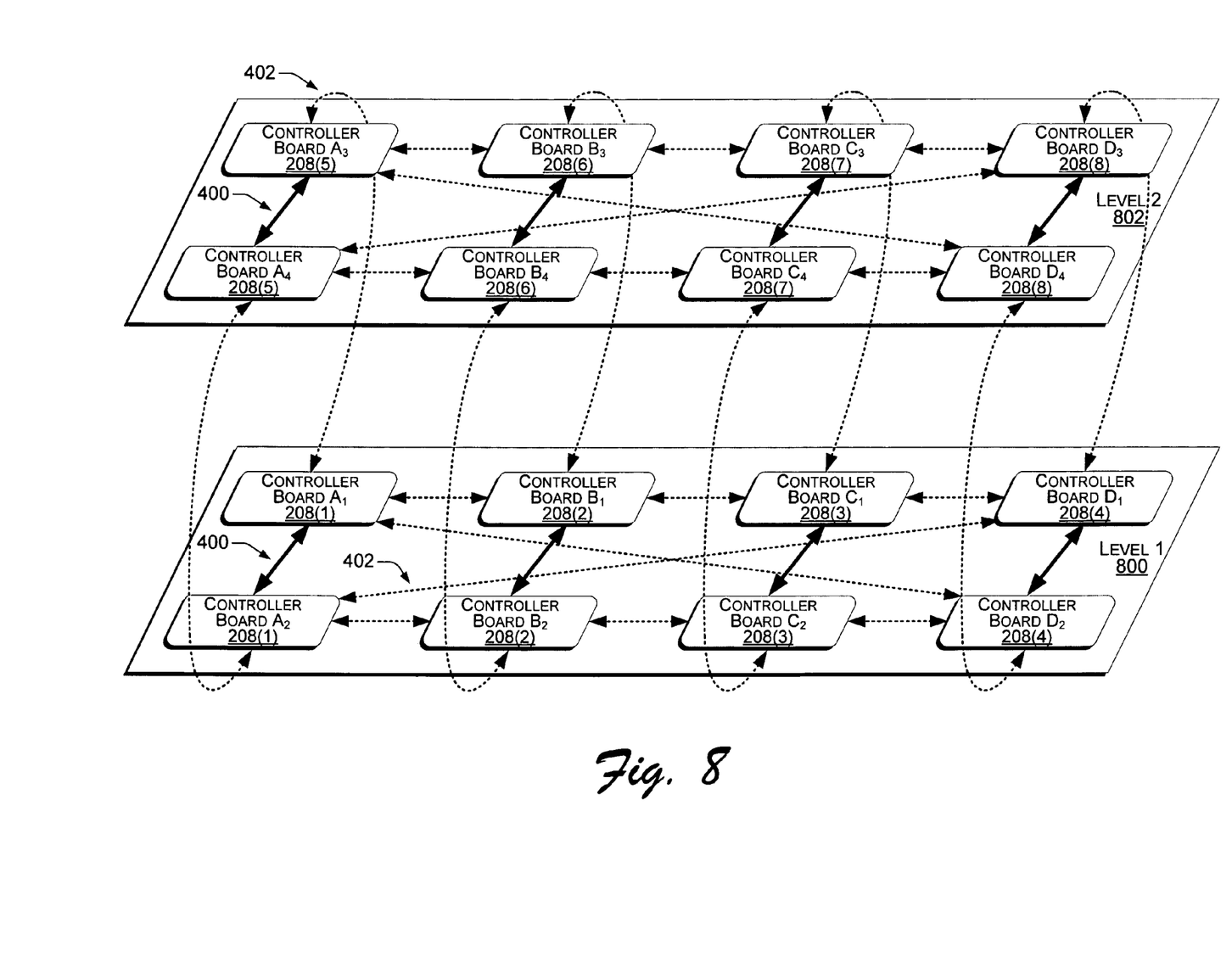
FIG. 8 shows a logical representation of another embodiment of a controller interconnect structure having an additional controller interconnect level such as might be implemented in the RAID disk array of FIG. 2.

FIG. 8 illustrates another embodiment of an always-on controller interconnect structure that is suitable for implementation in the RAID storage array 102 of FIGS. 1 and 2. Although as just mentioned above, the number of controllers can be increased in the previously described controller interconnect structures by extending the controller loops, the interconnect structure in the FIG. 8 embodiment enables an increase in the number of controller pairs 208 through the introduction of additional controller loops. This is accomplished in general by adding one or more levels of controllers to those already present in the embodiments described above relating to FIGS. 4, 5, 6 and 7. Increasing the number of controllers by adding "levels" allows the average path length between any two controllers to be shorter than if controllers were to be added by extending a single controller loop. Adding controller "levels" also adds multiple re-routing paths that can be used to allow multiple interconnect failures while keeping full interconnectivity.

Each controller level in the multi-level controller interconnect structure of FIG. 8 is configured in a manner similar to that of the controller interconnect structure of FIG. 4 described above. Therefore, like the controller interconnect structure of FIG. 4, a first controller level 800 of FIG. 8 includes controller pairs 208(1), 208(2), 208(3), and 208(4) coupled together as mirrored controller pairs and a continuous controller loop formed by coupling of all of the individual controllers from the controller pairs. In addition, however, the controller interconnect structure of FIG. 8 includes one or more additional controller levels such as, for example, level 2, 802. Each additional controller level is configured like the first controller level 800.

Accordingly, for each controller level (e.g., level 1 800, level 2 802, etc.), mirror buses 400 (represented by solid-lined arrows) carry mirror traffic between the two controllers in each of the mirrored controller pairs (e.g., controller pairs 208(1), 208(2), 208(3), 208(4), 208(5), 208(6), 208(7), and 208(8) of FIG. 8). In addition, each controller on a given controller level (e.g., level 1 800, level 2 802) forms part of a continuous controller loop by virtue of being coupled via loop buses 402 (represented by dashed-lined arrows) to two logically adjacent, but non-mirrored controllers within the same level. Thus, the controller interconnect structure for each controller level is configured like the controller interconnect structure described above with respect to FIG. 4.

Controller levels in the multi-level interconnect structure of FIG. 8, such as levels 800 and 802, are coupled to one another through loop buses 402 that couple controllers on one controller level to corresponding controllers on another level. For example, controller board $A_1$ from controller pair 208(1) on controller level 1, 800 corresponds with controller board $A_3$ from controller pair 208(5) on controller level 2, 802. Thus, a loop bus 402 operatively couples controller board $A_1$ 208(1) to controller board $A_3$ 208(5). Therefore, in addition to enabling the controller-to-controller communications described above with respect to the interconnect structure of FIG. 4 (i.e., mirrored communications between controllers in a mirrored pair, and pair-to-pair communications between different controller pairs), the multi-level controller interconnect structure of FIG. 8 enables pair-to-pair communications between controller pairs residing on different controller levels. In addition, like the controller interconnect structure of FIG. 4, the interconnect structure of FIG. 8 provides the same failure detection and rerouting features through failure detection and rerouting circuits 232.

Exemplary Method for Maintaining Controller Communications Over an Always-On Controller Interconnect Structure An example method for maintaining controller communications over an always-on controller interconnect structure in a multi-controller RAID storage array 102 will now be described with primary reference to FIG. 9. The method applies generally to the exemplary embodiments discussed above with respect to FIGS. 1-8.

Figure 9:
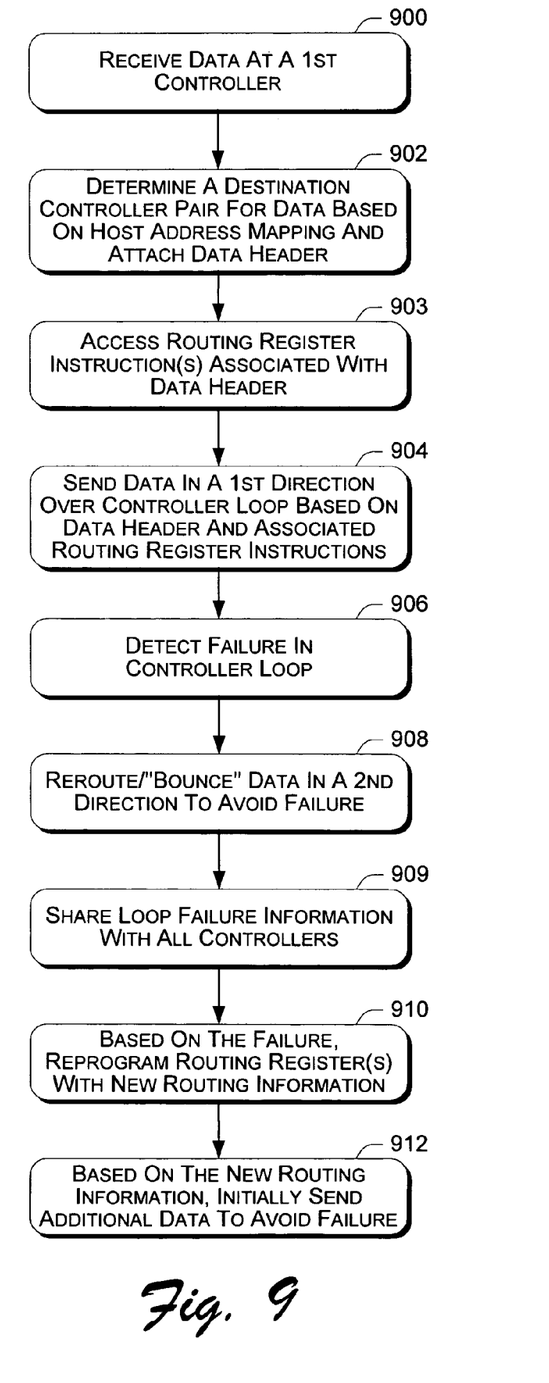
FIG. 9 is a flow diagram illustrating an example of a general method of performing controller communications over an always-on controller interconnect structure.

FIG. 9 is a flow diagram that shows an example of a general method of controller communication performed over an always-on controller interconnect structure in a multi-controller RAID storage array 102. The elements of the described method may be performed by any appropriate means, such as by the execution of processor-readable instructions defined on a processor-readable media, including a disk, a ROM or other such memory device.

Referring to the method illustrated in FIG. 9, at block 900, data is received at a first controller in a multi-controller storage array such as RAID storage array 102. At block 902, a controller pair that is the destination for the data is determined based on a mapping of the data's host address to an array address. Based on the mapping, a packet heading (or "header") is assigned to the data. At block 903, instruction(s) associated with the data header are accessed in routing register(s) 230. At block 904, the data is sent over a controller loop in a first direction that is determined by routing register 230 instruction(s) for the associated header information. Typically, this first direction will take the data to the nearest mirrored controller belonging to the destination controller pair. At 20 block 906, a failure is detected in the controller loop. At block 908, the data is automatically rerouted or "bounced" in a second direction around the controller loop that avoids the detected failure. At block 909, information regarding the loop failure is shared with other controllers so they can reprogram their routing registers to avoid the failure. At block 910, routing registers are reprogrammed with new routing information based on the detected failure. At block 912, the new routing information is used to send additionally received data in a direction over the controller loop that avoids the detected failure.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

The invention claimed is:

1. A disk array comprising:
    at least two controller pairs, each controller pair having a first controller coupled to a second controller through a mirror bus, wherein each bus is divided into a first half and a second half;
    a controller loop coupling all controllers through a plurality of loop buses;
    a first interconnect to which each controller is operatively coupled, the first interconnect carrying the first half of each bus; and
    a second interconnect to which each controller is operatively coupled, the second interconnect carrying the second half of each bus.

2. A disk array as recited in claim 1, wherein each controller in the controller loop is coupled to a first logically adjacent controller through a first loop bus and to a second logically adjacent controller through a second loop bus.

3. A disk array as recited in claim 1, wherein the controller loop further comprises:
    a first controller row having all first controllers coupled as a row of controllers; and
    a second controller row having all second controllers coupled as a row of controllers; and
    wherein a beginning controller in the first controller row is coupled to an ending controller in the second controller row and an ending controller in the first controller row is coupled to a beginning controller in the second controller row.

4. A disk array as recited in claim 1, wherein the first interconnect and the second interconnect are selected from a group of interconnects comprising:
    a back plane; and
    a cable.

5. A disk array as recited in claim 1, wherein each controller comprises routing logic configured to route data along the controller loop.

6. A disk array as recited in claim 5, wherein the routing logic comprises a programmable routing register configured to contain routing information usable by the routing logic.

7. A disk array as recited in claim 1, wherein each controller comprises a hardware circuit configured to detect a failure in the controller loop and to reroute data to avoid the failure.

8. A disk array as recited in claim 7, wherein the hardware circuit is further configured to modify contents of a routing register so that data is initially routed to avoid the failure.

9. A controller interconnect structure in a disk array comprising:
- a plurality of controllers;
- a plurality of communications buses operatively coupling the plurality of controllers to one another, each communications bus partitioned into a first half and a second half;
- a first interconnect to which each of the plurality of controllers is coupled, the first interconnect conveying the first half of the plurality of communications buses; and
- a second interconnect to which each of the plurality of controllers is coupled, the second interconnect conveying the second half of the plurality of communications buses.

10. A controller interconnect structure as recited in claim 9, wherein the plurality of controllers comprises a plurality of controller pairs, each controller pair having a first controller and a second controller.

11. A controller interconnect structure as recited in claim 10, wherein the plurality of communications buses comprises:
- between each controller pair, a mirror bus operatively coupling the first controller to the second controller; and
- a loop bus operatively coupling each controller with two logically adjacent controllers such that all controllers form part of a continuous controller loop.

12. A controller interconnect structure as recited in claim 9, wherein each controller further comprises routing logic configured to route data along the controller loop to a destination controller pair based on an address header and a routing instruction.

13. A controller interconnect structure as recited in claim 12, wherein the routing logic comprises a programmable routing register configured to contain the routing instruction, the routing logic further configured to access the programmable routing register and route data along the controller loop to a destination controller pair based on the routing instruction.

14. A controller interconnect structure as recited in claim 9, wherein each controller comprises a hardware circuit configured to detect a failure in the interconnect structure and to reroute data over the interconnect structure to avoid the failure.

15. A controller interconnect structure as recited in claim 14, wherein the hardware circuit is further configured to modify contents of a routing register so that data is initially routed over the interconnect structure to avoid the failure.

16. A controller interconnect structure as recited in claim 9, wherein the first interconnect and the second interconnect are selected from a group of interconnects comprising:
- a back plane; and
- a cable.

17. A processor-readable medium comprising processor-executable instructions configured for:
- determining a destination controller pair for a data packet based on a host address for the data packet and an array mapping of the host address to an array address;
- initially sending the data packet over a controller loop toward the destination controller pair in a first direction determined by a data header and a routing instruction;
- detecting a failure in the controller loop;
- rerouting the data packet in a second direction toward the destination controller pair;
- based on the failure, reprogramming a routing register with new routing information;
- based on the new routing information, initially sending additional data packets in a direction over the controller loop that avoids the failure;
- sharing failure information with all controllers; and
- based on the failure information, reprogramming routing registers on each controller with new routing information.

18. A processor-readable medium as recited in claim 17, wherein the determining further comprises attaching the data header to the data packet.

19. A processor-readable medium comprising processor-executable instructions configured for:
- receiving at a first controller in a first controller level, data that is destined for a second level controller pair located in a second controller level;
- sending the data over a first level controller loop to a first level controller pair that corresponds to the second level controller pair; and
- further sending the data from the first level controller pair to the second level controller pair via a loop bus that couples the first controller level to the second controller level.

20. A processor-readable medium as recited in claim 19, comprising further processor-executable instructions configured for:
- detecting a failure in a controller loop; and
- rerouting data traveling over the controller loop from a first direction to a second direction to avoid the failure.

21. A processor-readable medium as recited in claim 20, comprising further processor-executable instructions configured for:
- based on the failure, programming routing registers on all controllers in the controller loop with routing information; and
- based on the routing information, initially sending additional data in a direction over the controller loop that avoids the failure.

22. A processor-readable medium as recited in claim 20, comprising further processor-executable instructions configured for:
- sharing failure information with all controllers; and
- based on the failure information, reprogramming routing registers on each controller with new routing information.

23. A processor-readable medium comprising processor-executable instructions configured for:
- receiving data at a first controller in a first controller level;
- sending the data from the first controller to a second level controller pair via a loop bus that couples the first controller level to a second controller level; and
- further sending the data over a second level controller loop to a destination controller pair in the second controller level.

24. A method of routing data between controller pairs in a multi-controller disk array comprising:
- receiving at a first controller in a first controller level, data that is destined for a second level controller pair located in a second controller level;

sending the data over a first level controller loop to a first level controller pair that corresponds to the second level controller pair; and further sending the data from the first level controller pair to the second level controller pair via a loop bus that couples the first controller level to the second controller level.

25. A method of routing data between controller pairs in a multi-controller disk array comprising:

receiving data at a first controller in a first controller level;

sending the data from the first controller to a second level controller pair via a loop bus that couples the first controller level to a second controller level; and further sending the data over a second level controller loop to a destination controller pair in the second controller level.

* * * * *

UNITED STATES PATENT AND TRADEMARK OFFICE
CERTIFICATE OF CORRECTION

| | | |
|---|---|---|
| PATENT NO. | : 7,480,815 B2 | Page 1 of 1 |
| APPLICATION NO. | : 11/150796 | |
| DATED | : January 20, 2009 | |
| INVENTOR(S) | : Robert A. Rust et al. | |

It is certified that error appears in the above-identified patent and that said Letters Patent is hereby corrected as shown below:

In column 1, line 22, delete "Modem" and insert -- Modern --, therefor.

In column 12, line 7, delete "20 block" and insert -- block --, therefor.

Signed and Sealed this

Third Day of August, 2010

David J. Kappos
*Director of the United States Patent and Trademark Office*